Figure 1:
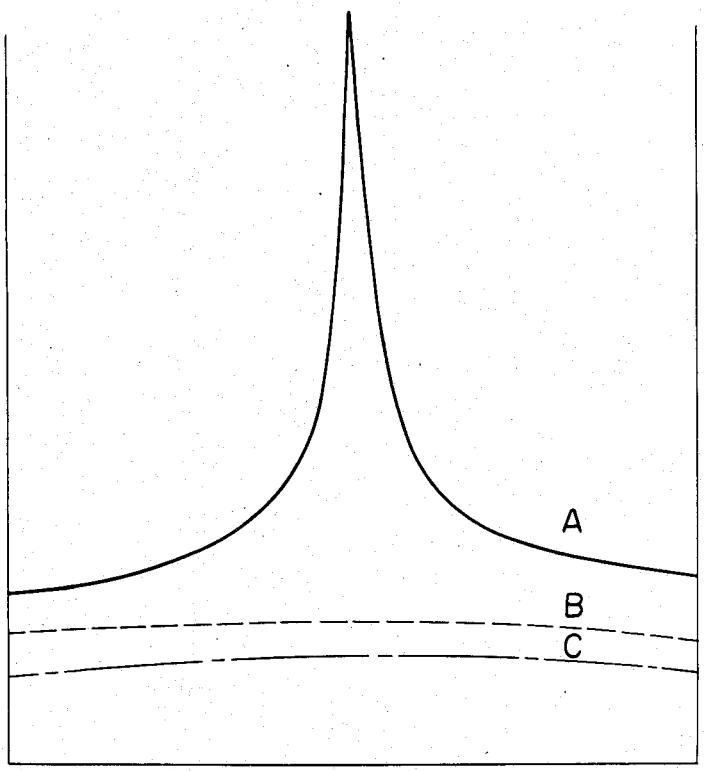

United States Patent

Tokuoka et al.

Patent Number: 4,663,246
Date of Patent: May 5, 1987

[54] MAGNETIC RECORDING MEDIUM

[75] Inventors: Yasumichi Tokuoka; Yoshisuke Yamakawa; Akio Watanabe, all of Tokyo, Japan

[73] Assignee: TDK Corporation, Tokyo, Japan

[21] Appl. No.: 617,535

[22] Filed: Jun. 5, 1984

[30] Foreign Application Priority Data

Jun. 10, 1983 [JP] Japan ............................... 58-102784

[51] Int. Cl.$^4$ ........................... G11B 5/72; B32B 3/00
[52] U.S. Cl. .................................... 428/694; 428/328; 428/329; 428/900; 427/131
[58] Field of Search ............... 428/694, 328, 329, 900; 427/131, 132, 127; 252/62.56

[56] References Cited

U.S. PATENT DOCUMENTS

| | | | |
|---|---|---|---|
| 4,071,654 | 1/1978 | Ogawa et al. | 428/694 X |
| 4,450,199 | 5/1984 | Tadokoro et al. | 428/694 X |
| 4,508,782 | 4/1985 | Miura et al. | 428/694 X |
| 4,550,049 | 10/1985 | Ono et al. | 428/694 X |

Primary Examiner—Nancy Swisher
Attorney, Agent, or Firm—Oblon, Fisher, Spivak, McClelland & Maier

[57] ABSTRACT

A magnetic recording medium having a magnetic coating containing therein ferromagnetic metal powder provided on a base film, wherein the magnetic recording medium being characterized in that the surface roughness of the magnetic coating, i.e., the surface roughness $R_{rms}$ (a unit of measurement of $\mu m$) with respect to a waveform having a wavelength P in a range of from 3 to 50 $\mu m$ out of groups of waveforms constituting the cross-sectional waveform of the surface of the magentic coating, satisfies the following equation:

$$R_{rms} \leq 7.5 \times 10^{-4} P + 7.5 \times 10^{-3}$$

where $3 \leq P \leq 50$ $\mu m$.

3 Claims, 2 Drawing Figures

MAGNETIC RECORDING MEDIUM

This invention relates to a magnetic recording medium manufactured by coating a plastic base film with a magnetic paint prepared by dispersing ferromagnetic metal powder in a binder. More particularly, it relates to a high density magnetic recording medium most suitable for short-wave recording by controlling the roughness of the surface of the magnetic layer under certain particular conditions.

Around the year of 1975, a Beta-format system and a VHS system were developed one after the other as a high density color image recording system, owing to which small-sized video tape recorders (VTR) for household use have been rapidly diffused among consumers and are still continuing to expand their market even this day. While reduction in size of the VTR of the abovementioned systems is under progress, however, continued studies and researches are also being undertaken in an attempt to realize higher density in the recording, as the result of which there has already been announced a new recording system with its recording wavelength having been reduced to 1 μm or shorter. On such background, studies are also under way so as to develop a recording medium capable of keeping up with such high density recording, the principal purpose of which can be said to be in realizing increased recording output and reduced noise in the short wavelength recording.

With respect to the output, it has already been pointed out that the residual magnetic flux density Br, and the magnetic coercive force Hc of the magnetic recording tape, and further a clearance between the magnetic recording tape and the recording head constitute the governing factors for the output. For the increased output, magnetic powder of metal type having both magnetic coercive force and saturated magnetism which are twice as high as those of the magnetic powder of oxide type is useful. With such metal type magnetic powder, it has become possible to manufacture the magnetic recording medium having a ratio of Br/Hc which is substantially equal to that of the oxide type magnetic recording medium and the residual magnetic flux density which is approximately twice as high as that of the oxide type magnetic recording medium, and to improve the output which is approximately twice as high as that of the oxide type magnetic recording medium, i.e., about 6 dB. On the other hand, the clearance between the tape and the head attenuates a signal voltage to be received by the recording head from the tape surface, which causes decrease in the output as the so-called "clearance loss". This clearance loss is represented by a ratio d/λ where d is the clearance between the tape and the recording head and λ is the recording wavelength at that time. For instance, when the recording wavelength decreases to a half, the clearance should also be reduced to a half, otherwise the clearance loss cannot be kept constant. The shorter the recording wavelength becomes, the greater becomes the influence on the clearance loss. In this respect, efforts have so far been made to minimize the clearance to be formed between the magnetic recording tape and the recording head, by smoothing the surface of the magnetic coating to the maximum possible extent.

On the other hand, as to the problem of noises in the video tape, although there are various factors such as apparatus noise, tape demagnetization noise, etc., the most influential factor is the tape modulation noise, which depends largely on the irregularities on the surface of the magnetic layer. Accordingly, improvement in the surface smoothness of the magnetic layer is indispensable also for reducing the tape modulation noises.

From these points, it is widely recognized at present that, in the short wave recording, the surface smoothness of the magnetic coating has very close relationship with both the increased output and the reduced noise, the improvement of which constitutes important technology associated with high performance of the magnetic recording medium.

However, in spite of such importance in the surface smoothness of the magnetic coating, the surface smoothness has so far been understood very generally as the surface roughness or difference in surface irregularities or an average value of such surface irregularities. In general, the surface roughness is represented by $R_{max}$, Rz (see JIS B 0601 (Surface Roughness)), etc.. Also, a symbol $R_{rms}$ has been proposed for the reason that the surface roughness has close bearing on the tape characteristics. $R_{rms}$ can be obtained from the following equation:

$$E_{rms} = \sqrt{1/n \sum_{i=1}^{n} hi^2}$$

where:
hi is a difference between a peak and a valley of adjacent waves; and
n represents a number of waves.

With such a simple manner of indication of the surface roughness, the corresponding relationship between the characteristics of the high density magnetic recording tape and the surface smoothness thereof cannot be grasped quantitatively to a satisfactory extent. This has remained to be a large obstacle in an attempt for increasing performance of the recording tape for the short wavelength recording. For this purpose, it is necesary to grasp the surface smoothness in a manner in which it adequately reflects the characteristics of the magnetic recording tape and to control the surface smoothness of the magnetic coating based on such knowledge.

Under the circumstances, the present invention has succeeded in manufacturing the magnetic recording tape of excellent characteristics by precise classification of the surface roughness of the magnetic coating, i.e., the cross-sectional profile curves, into its component waves, then segregating from the thus classfied component waves those wavelength components which are effective for enhancing the characteristics of the recording tape, in particular, for reducing the modulation noises of the tape, and finally regulating these segregated wavelength components under certain definite conditions.

It is therefore an object of the present invention to provide a high density magnetic recording medium excellent in its short wavelength recording.

It is another object of the present invention to provide a high density magnetic recording medium of improved quality with reduced noises and high recording output.

According to the present invention, in one aspect of it, there is provided a magnetic recording medium having a magnetic coating containing therein ferromagnetic metal powder provided on a base film, said magnetic recording medium being characterized in that the surface roughness of said magnetic coating, i.e., the surface roughness $R_{rms}$ (a unit of measurement of $\mu m$) with respect to a waveform having a wavelength P in a range of from 3 to 50 $\mu m$ out of groups of waveforms constituting the cross-sectional waveforms of the surface of said magnetic coating, satisfies the following equation:

$$R_{rms} \leq 7.5 \times 10^{-4} P + 7.5 \times 10^{-3}$$

where $3 \leq P \leq 50$ $\mu m$.

According to the present invention, in another aspect of it, there is provided a method for fabricating a magnetic recording medium which comprises steps of: (a) applying a magnetic paint containing therein ferromagnetic metal powder onto a base film; (b) subjecting the surface of said magnetic paint coating to a surface smoothing process; and (c) curing said magnetic coating, said surface smoothing process being carried out in such a manner that the surface roughness of said magnetic coating, i.e., the surface roughness $R_{rms}$ (a unit of measurement of $\mu m$) with respect to a waveform having a wavelength P in a range of from 3 to 50 $\mu m$ out of groups of waveforms constituting the cross-sectional waveform of said magnetic coating surface, satisfies the following equation: $R_{rms} \leq 7.5 \times 10^{-4} P + 7.5 \times 10^{-3}$ where $3 \leq P \leq 50$ $\mu m$.

The foregoing objects, other objects as well as specific construction and function of the magnetic recording medium according to the present invention will become more apparent and understandable from the following detailed description thereof, when read in conjunction with the accompanying drawing.

Figure 2:
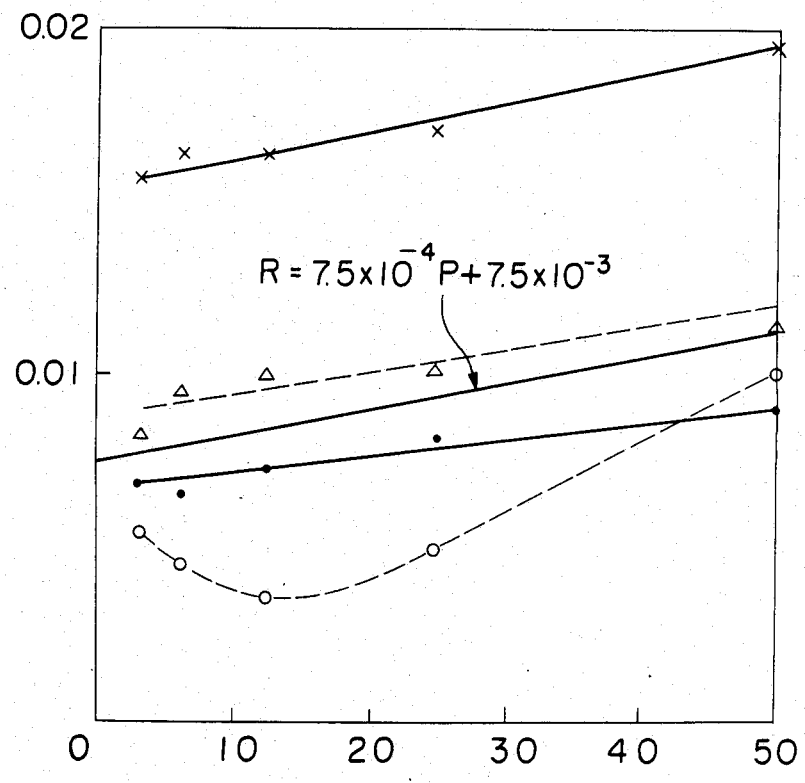

In the accompanying drawing:

FIG. 1 is a graphical representation showing a noise spectrum of a video recording tape, in which the noise distributions are indicated in both left and right sides with the carrier signal peak as the center; and FIG. 2 is also a graphical representation showing a relationship between the surface roughness of the recording medium and various wavelength in both actual embodiment of the present invention and comparative examples.

In the folowing, the present invention will be explained in specific details in reference to the accompanying drawing.

In general, the noise spectrum of the magnetic tape is distributed to both left and right sides, like the side bands, with a carrier wave as its center as shown in FIG. 1. The term "noise" includes therein apparatus noise component and tape demagnetization noise components. However, the prominent increase in the noise in the vicinity of the carrier wave is caused by tape modulation noise components, which is largely due to the surface condition of the magnetic coating, as has already been mentioned in the foregoing. Accordingly, by smoothing the surface of the magnetic coating so as to sufficiently reduce the tape modulation noise, there can be realized not only the decreased noise, but also the reduced clearance loss between the tape and the head, whereby high recording output can be obtained.

Therefore, as the results of detailed studies on the relationship between this tape modulation noise and the surface roughness, it has been found out that, in a range of the central recording wavelength of from 0.5 to 1.5 $\mu m$, the wavelength range of which will become the principal stream in the future recording technology, waveform component of the surface roughness which would remarkably affect the tape modulation noise falls within a wavelength range of from 3 to 50 $\mu m$. That is to say, of a multitude of the waveform components constituting the surface cross-sectional profile curves of the magnetic coating, those components having a wavelength range of from 3 to 50 $\mu m$ gives major influence on the tape modulation noise. Accordingly, by controlling these components alone, the tape modulation noise can be substantially reduced.

It has further been found out that the characteristics of the magnetic tape can be remarkably improved, when a magnetic coating is rendered to have its surface which has been so controlled that the surface roughness $R_{rms}$ (a unit of measurement of $\mu m$) corresponding to any one arbitrary wavelength P, taken out of the waveform component groups having the wavelength range of from 3 to 50 $\mu m$, may satisfy the following equation (I): $R_{rms} \leq 7.5 \times 10^{-4} P + 7.5 \times 10^{-3}$ (where: $3 \leq P \leq 50$ $\mu m$). The equation has been established by experimentally finding a relationship between roughness ($R_{rms}$) to determine the permissible upper limit of the noise and the wavelength (P).

In this way, it becomes possible to control adequately and quantitatively the surface smoothness of the magnetic coating in an attempt to realize the reduced noise level and the increased output, whereby the high density magnetic recording medium for the short wavelength recording can be manufactured consistently.

The properties of the magnetic coating surface of the magnetic recording medium are determined by the degree of surface roughness of the base film and the properties of the magnetic coating such as, for example, shape and content of the magnetic powder, composition of a binder, kind and quantity of additives, a type of the surface smoothing process, and so forth. After application of the magnetic paint onto the base film, it is dried and subjected to the surface smoothing process. Thereafter, the coating is cured by heat treatment.

There are various surface processing methods, among which the calendering method is representative. Besides this, the casting method is also effective. The casting method is such one that forms the coating with a flat and smooth surface as a casting mold. More specifically, the method is to form, first of all, a flat and smooth surface by vapor-deposition of a metal such as aluminum on a base film, over which a magnetic paint is applied, dried, and subjected to a work such as the calendering process; thereafter, a highly adhesive paint is applied on the rear surface of the base film opposite to the surface side where the magnetic paint has been applied, and then the combination of the base film, the magnetic coating and the adhesive coating is taken up in a roll form, and finally subjected to heat-treatment to cure. By this process, the magnetic coating is transferred and adhered to the rear surface side of the base film, whereby the surface of the magnetic paint coating which has thus far been in contact with the vapor-deposited metal surface becomes exposed outside as a new magnetic coating surface. This exposed coating surface has extremely high flatness and smoothness by taking after the flatness and smoothness of the vapor-deposited metal surface through the transfer. For the vapor-deposited metal layer, there may be used, besides aluminum, those metals such as nickel, iron, cobalt, copper, chromium, zinc, tin and so forth. The vapor-deposited layer, thereafter, functions as the back-coating and becomes able to contribute to protection of the base film, and stable and smooth running of the tape. It goes without saying that, besides the vapor-deposited layer, a flat and smooth surface having good peeling (or releasing) property may be used.

Measurement of the surface roughness can be done by use of various types of roughness measuring meter such as tracing type, optical type, electrical type, and various others. While the cross-sectional profile curves of the coated surface thus detected by the roughness measuring meter can be analyzed by the Fourier analysis into a multitude of basic waveform groups constituting the profile curves, the present invention detects by use of the tracing type surface roughness measuring meter (Talystep) only those waveforms falling within a range of ±3 dB with a frequency corresponding to a particular wavelength in accordance with a band pass filter as the center. If the frequency to be detected is denoted by f and the operating speed of the stylus for tracing is represented by $v$, a corresponding wavelength $\lambda$ can be given as follows: $\lambda = v/f$, (In the present invention, the measurement was done under the condition of $v = 30$ m/sec.)

By the above-described method of measuring the surface roughness, it is possible to select only the waves having a particular wavelength component in the surface roughness, and to write out such waveforms on a recording sheet. Then, the surface roughness $R_{rms}$ is calculated as to the waveforms having the selected wavelength range of from 3 to 50 μm, and the calculated value is checked for compliance or non-compliance with an equation $R_{rms} \leq 7.5 \times 10^{-4} P + 7.5 \times 10^{-3}$ (where P denotes a wavelength). Such calculation can be done easily by the computer processing.

In the above-described manner, a degree of finishing of the surface processing, which has so far been controlled as a mere difference in the surface irregularities of the magnetic coating, becomes able to be controlled in a mode which is closely associated with the characteristics of the magnetic recording medium, whereby the high product quality of the magnetic recording medium thus fabricated is guaranteed.

With a veiw to enabling those persons skilled in the art to put the present invention into practice, the following preferred examples are presented together with comparative examples.

EXAMPLE 1

A magnetic paint was prepared by sufficiently mixing and dispersing 50 parts by weight of vinyl chloride/vinyl acetate copolymer resin, 50 parts by weight of polyurethane resin, 5 parts by weight of a lubricant, 300 parts by weight of methyl ethyl ketone, and 250 parts by weight each of MIBK and toluene with and into 400 parts by weight of acicular metal magnetic powder consisting principally of iron, and having a magnetic coercive force of 1,450 Oe, a saturated magnetism of 115 emu/g, and an average major axis length of 0.3 μm. To this magnetic paint, there was added a curing agent, and the paint was applied to a base film of polyester terephthalate to a film thickness of 4 μm upon its drying. The surface roughness Rz of the base film used was 0.025 μm.

After drying of the coated layer of the magnetic paint, the surface was subjected to the calender processing for three times, followed by heat treatment of the coated base film in a rolled form to cure the paint coating. After the curing, the base film was severed in a predetermined width, and the characteristics of each piece of the magnetic tape thus prepared was evaluated. The results are shown in table 1 below. Incidentally, the surface roughness $R_{rms}$ of each tape shown in table 1 was measured by use of the tracing type surface roughness measuring meter operating at a speed of 30 μm/sec..

In this case, a band pass filter was used for detecting the surface roughness with the particular wavelength alone, based on which only the waves in a wavelength range of ±3 dB with a frequency corresponding to a particular wavelength as the center was detected, and the detected result was processed by a computer to calculate the surface roughness $R_{rms}$.

On the other hand, the recording and reproduction characteristics of the magnetic tape were measured by use of a Sendust head having a head cap of 0.25 μm, at a relative speed of the tape head of 3.75 m/sec. and at a recoring frequency of 4.5 MHz. As a standard magnetic tape, there was chosen "VHS T-160" manufactured by Tokyo Denki Kagaku Kogyo K.K., Tokyo. The C/N as shown in Table 1 below is a ratio of noise to a carrier signal level with the C/N ratio of the standard tape being made 0 dB.

COMPARATIVE EXAMPLE 1

The magnetic paint was prepared in the same manner as in Example 1 above with the exception that the surface roughness Rz of the base film used was 0.06 μm. The results of measurement are shown in table 1 below.

EXAMPLE 2

On the base film having its surface roughness Rz of 0.01 μm, aluminum was once vapor-deposited. Over this deposited alumium layer, the same magnetic paint as that in Example 1 above was applied and dried. After drying of the paint coating, it was subjected to the calendering process. Subsequently, on the rear surface of the base film opposite to the surface side where the magnetic paint was coated, there was applied an epoxy or urethane type paint to a thickness of less than 1 μm, and the tape was taken up in roll, and then subjected to heat treatment, as it was, for curing. By this treatment, the magnetic coating was transferred and adhered onto the rear surface side of the base film, whereby there was formed the magnetic coating with its boundary surface with deposited aluminum layer as the outer surface thereof. The thus obtained specimen was severed into a predetermined width, and the characteristics thereof were evaluated. The results of measurement are shown in table 1 below.

COMPARATIVE EXAMPLE 2

The magnetic coating was formed in the same manner as in Example 1 above with the exception that the surface processing by calendering using the base film as used in Example 2 above was carried out for once. The thus obtained specimen was cut into a predetermined width, and the characteristics thereof were measured. The results of measurement are shown in Table 1.

TABLE 1

| | Magnetic coercive force Hc (Oe) | Residual magnetism Br (G) | Br/Bm | Roughness Rrms ($\times 10^{-3}$ m) | | | | | C/N (dB) | | Rz ($\mu$m) |
| | | | | P = 50 $\mu$m | P = 25 $\mu$m | P = 12.5 $\mu$m | P = 6.25 $\mu$m | P = 3.13 $\mu$m | f = 1 MHz | f = 0.3 MHz | |
|---|---|---|---|---|---|---|---|---|---|---|---|
| Calculated value of equation (1) | — | — | — | 11.3 | 9.4 | 8.4 | 8.0 | 7.7 | — | — | — |
| Example 1 | 1380 | 2400 | 0.75 | 9.1 | 8.1 | 7.3 | 6.4 | 6.8 | 12.5 | 12.4 | 0.030 |
| Example 2 | 1375 | 2400 | 0.75 | 10.0 | 5.0 | 3.6 | 4.8 | 5.4 | 12.6 | 14.1 | 0.028 |
| Comparative Example 1 | 1390 | 2350 | 0.75 | 19.8 | 17.2 | 16.5 | 16.5 | 15.7 | 11.3 | 7.2 | 0.051 |
| Comparative Example 2 | 1380 | 2200 | 0.74 | 11.5 | 10.2 | 10.0 | 9.5 | 8.5 | 12.0 | 11.8 | 0.030 |

FIG. 2 is a graphical representation showing a relationship between the surface roughness $R_{rms}$ and the wavelength P, which has been taken from the results as indicated in Table 1 above. It is seen from FIG. 2 that, in examples 1 and 2, the roughness $R_{rms}$ of each wave in the wavelength range of from 3 to 50 $\mu$m is below the rectilinear line $R = 7.5 \times 1.0^{-4}P + 7.5 \times 10^{-3}$. By thus effecting control of the surface roughness, there can be done adequately and easily the smoothing of the coating surface sufficient to realize the noise reduction in the magnetic recording medium. This does not only attain the reduction in noise in the magnetic recording medium, but also increase in output accompanied by decrease in the clearance loss, whereby high density magnetic recording medium for short wave recording of excellent performance can be provided.

Although, in the foregoing, the present invention has been described in detail with reference to a couple of preferred embodiments thereof, it should be understood that any changes and modifications may be made by those persons skilled in the art within the spirit and scope of the invention as set forth in the appended claims.

We claim:

1. A magnetic recording medium having a magnetic coating containing therein ferromagnetic metal powder provided on a base film, said magnetic recording medium being characterized in that the surface roughness of said magnetic coating, i.e., the surface roughness $R_{rms}$ (a unit of measurement of $\mu$m) with respect to a waveform having a wavelength P in a range of from 3 to 50 $\mu$m out of groups of waveforms constituting the cross-sectional waveform of the surface of said magnetic coating, satisfies the following equation:

$$R_{rms} \leq 7.5 \times 10^{-4}P + 7.5 \times 10^{-3}$$

where $3 \leq P \leq 50$ $\mu$m.

2. The magnetic recording medium according to claim 1, wherein said ferromagnetic metal powder is principally composed of iron powder.

3. The magnetic recording medium according to claim 1, wherein said base film has a vapor-deposited coating of metal selected from the group consisting of aluminum (Al), nickel (Ni), iron (Fe), cobalt (Co), copper (Cu), chromium (Cr), zinc (Zn), and tin (Sn) on the surface opposite to the side where said magnetic coating is provided.

* * * * *